US 9,092,735 B2

(12) United States Patent
Hunzinger et al.

(10) Patent No.: US 9,092,735 B2
(45) Date of Patent: Jul. 28, 2015

(54) METHOD AND APPARATUS FOR STRUCTURAL DELAY PLASTICITY IN SPIKING NEURAL NETWORKS

(75) Inventors: Jason Frank Hunzinger, Escondido, CA (US); Victor Hokkiu Chan, Del Mar, CA (US); Jeffrey Alexander Levin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 13/238,088

(22) Filed: Sep. 21, 2011

(65) Prior Publication Data

US 2013/0073501 A1   Mar. 21, 2013

(51) Int. Cl.
*G06F 15/18* (2006.01)
*G06J 1/00* (2006.01)
*G06N 3/00* (2006.01)
*G06N 3/04* (2006.01)
*G06N 3/08* (2006.01)

(52) U.S. Cl.
CPC ............... *G06N 3/049* (2013.01); *G06N 3/088* (2013.01)

(58) Field of Classification Search
None
See application file for complete search history.

(56) References Cited

U.S. PATENT DOCUMENTS

| | | | |
|---|---|---|---|
| 5,459,817 A | 10/1995 | Shima | |
| 5,666,079 A | 9/1997 | Ma | |
| 6,505,182 B1 | 1/2003 | Van | |
| 6,581,046 B1 | 6/2003 | Ahissar | |
| 7,174,325 B1 | 2/2007 | Ascoli | |
| 7,287,014 B2 | 10/2007 | Chen et al. | |
| 7,412,428 B2 | 8/2008 | Nugent | |
| 7,430,546 B1 | 9/2008 | Suri | |
| 7,512,271 B2 | 3/2009 | Matsugu et al. | |
| 7,904,398 B1 | 3/2011 | Repici | |
| 8,433,665 B2 | 4/2013 | Tang et al. | |
| 8,606,732 B2 | 12/2013 | Venkatraman et al. | |
| 8,625,337 B2 | 1/2014 | Wu et al. | |
| 8,694,452 B2 | 4/2014 | Aparin et al. | |
| 8,706,662 B2 | 4/2014 | Chan et al. | |
| 8,756,173 B2 | 6/2014 | Hunzinger et al. | |
| 2004/0097562 A1 | 5/2004 | Olesen et al. | |
| 2006/0235477 A1 | 10/2006 | Rom | |
| 2008/0208783 A1 | 8/2008 | Jaros et al. | |
| 2009/0287624 A1 | 11/2009 | Rouat et al. | |
| 2009/0313195 A1 | 12/2009 | McDaid et al. | |
| 2010/0076916 A1 | 3/2010 | Van et al. | |
| 2010/0145402 A1* | 6/2010 | Rom | ............................ 607/17 |

(Continued)

FOREIGN PATENT DOCUMENTS

JP    7084978 A   3/1995
TW    242981      3/1995

(Continued)

OTHER PUBLICATIONS

Eurich et al. "Dynamic of Self-Organized Dalay Adaptation", Physical Review Letters, vol. 82, No. 7, pp. 1594-1597.*

(Continued)

*Primary Examiner* — Li-Wu Chang
(74) *Attorney, Agent, or Firm* — Rupit M. Patel

(57) ABSTRACT

Certain aspects of the present disclosure relate to a technique for adaptive structural delay plasticity applied in spiking neural networks. With the proposed method of structural delay plasticity, the requirement of modeling multiple synapses with different delays can be avoided. In this case, far fewer potential synapses should be modeled for learning.

28 Claims, 9 Drawing Sheets

(56) References Cited

U.S. PATENT DOCUMENTS

| | | |
|---|---|---|
| 2010/0185250 A1 | 7/2010 | Rom |
| 2010/0220523 A1 | 9/2010 | Modha et al. |
| 2010/0235310 A1 | 9/2010 | Gage et al. |
| 2010/0299296 A1 | 11/2010 | Modha et al. |
| 2010/0299297 A1 | 11/2010 | Breitwisch et al. |
| 2011/0137843 A1 | 6/2011 | Poon et al. |
| 2011/0153533 A1 | 6/2011 | Jackson et al. |
| 2012/0011089 A1 | 1/2012 | Aparin et al. |
| 2012/0084241 A1 | 4/2012 | Friedman et al. |
| 2012/0109864 A1 | 5/2012 | Modha |
| 2012/0150781 A1 | 6/2012 | Arthur et al. |
| 2013/0024409 A1 | 1/2013 | Hunzinger et al. |
| 2013/0046716 A1 | 2/2013 | Chan et al. |
| 2013/0073491 A1 | 3/2013 | Izhikevich et al. |
| 2013/0103626 A1 | 4/2013 | Hunzinger |
| 2013/0226851 A1 | 8/2013 | Hunzinger et al. |
| 2013/0339280 A1 | 12/2013 | Hunzinger et al. |

FOREIGN PATENT DOCUMENTS

| | | |
|---|---|---|
| WO | 9318474 A1 | 9/1993 |
| WO | 9729437 A1 | 8/1997 |

OTHER PUBLICATIONS

Bako et al. "Hardware Implementation of Delay-coded Spiking-RBF Neural Network for Unsupervised Clustering", OPTIM, 2008, pp. 51-56.*

Arena et al. "STDP with adaptive synaptic delay for robot navigation Control", Proc. of SPIE vol. 6592, 2007, pp. 10.*

Gilson et al. "Emergence of network structure due to spike-timing-dependent plasticity in recurrent neuronal networks. I. Input selectivity—strengthening correlated input pathways", Biol Cybern, 2009, 101, pp. 81-102.*

Bako, L, et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bohte, S.M. et al., "Unsupervised Clustering with Spiking Neurons by Sparse Temporal Coding and Multilayer RBF Networks," in IEEE Transactions on Neural Networks, 2002, vol. 13(2), pp. 426-435.

Duro, et al., "Discrete-Time Backpropagation for Training Synaptic Delay-Based Artificial Neural Networks," IEEE Transactions on Neural Networks, vol. 10, No. 4, Jul. 1999, pp. 779-789.

Maass, W. et al, "On the complexity of learning for spiking neurons with temporal coding", 1999.

Murakoshi, K. et al., "Firing Time of Neuron by Interference Between Synaptic Inputs," in International Conference on Systems, Man, and Cybernetics (SMC), 1999, pp. 377-382.

Natschlager, T. et al., "Spatial and temporal pattern analysis via spiking neurons", in Institute for Theoretical Computer Science, Technische Universitat Gratz, Austria, pp. 9(3): 319-32, 1998.

Ruf, B. et al. "Hebbian learning in networks of spiking neurons using temporal coding", in Biological and artificial computation: From neuroscience to technology, pp. 380-389, 1997.

Senn, et al., "An Algorithm for Synaptic Modification Based on Exact Timing of Pre- and Post-Synaptic Action Potentials," In Proceedings: ICANN, 1997, 6 pgs.

Brette et al.,"Simulation of networks of spiking neurons: A review of tools and strategies," Springer, Journal of Computational Neuroscience, vol. 23, pp. 349-398, 2007.

Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.

Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.

Park, H.O., et al., "Discrete Synapse Recurrent Neural Network for nonlinear system modeling and its application on seismic signal classification", Neural Networks (IJCNN), The 2010 International Joint Conference on, IEEE, Piscataway, NJ, USA, Jul. 18, 2010, pp. 1-7, XP031771705.

Schaik, A.V., et al., "A log-domain implementation of the Izhikevich neuron model", IEEE International Symposium on Circuits and Systems. ISCAS May 30, -Jun. 2, 2010—Paris, France, IEEE, US, May 30, 2010, pp. 4253-4256, XP031724796, ISBN: 978-1-4244-5308-5 the whole document.

Amemori. K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.NEUC0M.2003.09.013 p. 291-315.

Arena, P., et al., "STDP with adaptive synaptic delay for robot navigation control", Proceedings of SPIE, vol. 6592, May 18, 2007, XP055049378, ISSN: 0277-786X, DOI: 10.1117/12.724204 pp. 65920J-1-65920J-9, paragraph 3.

Babadi, B., et al., "Intrinsic Stability of Temporally Shifted Spike-Timing Dependent Plasticity", PLOS Computational Biology, vol. 6, No. 11, Jan. 1, 2010, pp. el000961-el000961, XP55040430, ISSN: 1553-734X, DOI: 10.1371/journal.pcbi.1000961 p. 1-13, right-hand column, paragraph 4.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-1303, right-hand column, paragraph 2.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Cameron, K., et al., "Spike Timing Dependent Adaptation for Mismatch Compensation", 2006 IEEE International Symposium on Circuits and Systems May 21-24, 2006 Island of Kos, Greece IEEE—Piscataway, NJ,USA,May 21, 2006, XP010938590, DOI: 10.1109/ISCAS.2005.1692812 ISBN: 978-0-7803-9389-9, pp. 1223-1226.

Caporale, N., et al., "Spike Timing-Dependent Plasticity: A Hebbian Learning Rule", Annual Review of Neuroscience, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2—p. 36, left-hand column, paragraph 1.

Clopath, et al.,. "Predicting Neuronal Activity with Simple Models of the Threshold Type: Adaptive Exponential Integrate-and-Fire Model with Two Compartments," Preprint submitted to Elsevier Science, Aug. 29, 2006, 6 pgs.

Dan et al., Spike timing-dependent review plasticity of neural circuits, Neuron, Sep. 2004, pp. 23-30, vol. 44.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemike, et al.,. "Temporal modulation of spike-timing-dependent plasticity," Frontiers in Synaptic Neuroscience, vol. 2, Article 19, Jun. 2010, 16 pgs.

Gilson, M., et al., "Stability versus Neuronal Specialization for STDP: Long-Tail Weight Distributions Solve the Dilemma", PLOS One, vol. 6, No. 10, Jan. 1, 2011, p. e25339, XP055052242, ISSN: 1932-6203, DOI: 10.1371/journal.pone.0025339.

Huerta, et al., "Bidirectional Synaptic Plasticity Induced by a Single Burst during Cholinergic Theta Oscillation In CA1 In Vitro," Neuron vol. 15, 1995, pp. 1053-1063.

International Search Report and Written Opinion—PCT/US2012/056723—ISA/EPO—Jan. 23, 2013.

Johnston, S.P., et al., "A Hybrid Learning Algorithm Fusing STDP with GA based Explicit Delay Learning for Spiking Neurons", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

(56) References Cited

OTHER PUBLICATIONS

Kubota et al,, "Modulation of LTP/LTD balance in STDP by an activity-dependent feedback mechanism," Neural Network, vol. 22, 2009, pp. 527-535.

Paugam-Moisy, H., et al., "A supervised learning approach based on STDP and polychronization in spiking neuron networks", ESANN'2007 proceedings-European Symposium on Artificial Neural Networks, Apr. 1, 2007, pp. 25-27, XP055049375, Bruges, Belgium ISBN: 2930307072Retrieved from the Internet:URL:http://www.elen.ucl.ac.be/Proceedings/esann/esannpdf/es2007-95.pdf[retrieved on Jan. 11, 2013] p. 427-432, line 4.

Schemmel J. et al., "Implementing Synaptic Plasticity in a VLSI Spiking Neural Network Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the Internet: URL:http://www.kip.uni-heidelberg.de/Veroeffentiichungen/download.cgi/4620/ps/1774.pdf [retrieved on Nov. 23, 2009].

Standage, D., et al., "The Trouble with Weight-Dependent STDP", Neural Networks, 2007. IJCNN 2GG7. International Joint Conference on, IEEE, Piscataway, NJ, USA, Aug. 1, 2007, pp. 1348-1353, XP031154790, ISBN: 978-1-4244-1379-9.

Tanaka, H., et al., "A CMOS Spiking Neural Network Circuit with Symmetric/Asymmetric STDP Function", IEICE Transactions on Fundamentals of Electronics,Communications and Computer Sciences, Engineering Sciences Society, Tokyo, JP, vol. E92A, No. 7, Jul. 1, 2009, pp. 1690-1698, XP001547503, ISSN: 0916-8508, DOI: 10.1587/TRANSFUN.E92.A. 1690 p. 1690-1696, right-hand column.

Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, D0l: 10.1109/10.923785 Section III.A.1.

Friedrich J., et al., "Dynamics of recurrent neural networks with delayed unreliable synapses: metastable clustering," Journal of Computational Neur0science, vol. 27, No. 1, Dec. 10, 2008, pp. 65-80, XP019730519, DOI:10.1007/S10827-008-0127-1 Section 2.

Lubenov E.B., et al., "Decoupling through synchrony in neuronal circuits with propagation delays", Neuron, vol. 58, No. 1, Apr. 9, 2008. pp. 118-131, XP055101258, D01:10.1016/j.neuron.2008.01. 036 Experimental procedures.

Morrison A., et al., "Phenomenological models of synaptic plasticity based on spike timing," Biological Cybernetics, vol. 98, No. 6, Apr. 6, 2008, pp. 459-478, XP019630139, DOI: 10.1007/500422-008-0233-1 Section 4.1.3.

Lam J., et al., "Novel global robust stability criteria for interval neural networks with multiple time-varying delays" Physics Letters A 342. 4, 2005, pp. 322 -330.

Liu X., et al., "Global exponential stability of generalized recurrent neural networks with discrete and distributed delays" Neural Networks 19.5, 2006, pp. 667-675.

Qu Y., et al., "Global robust stability of delayed recurrent neural networks" Chaos, Solitons & Fractals 23.1, 2005, pp. 221 -229.

Schrauwen B., et al,. "Extending SpikeProp," Neural Networks, 2004. Proceedings. 2004 IEEE International Joint Conference on , vol. 1, number, pp. 475, 25-29 Jul. 2004, DOI: 10.1109/IJCNN.2004. 1379954.

Zidong., et al., "Exponential stability of uncertain stochastic neural networks with mixed time-delays" Chaos, Solitons & Fractals 32.1, 2007, pp. 62-72. 0.

Beerhold J R., et al., "Pulse-Processing Neural Net Hardware with Selectable Topology and Adaptive Weights and Delays," Neural Networks, IJCNN International Joint Conference on, Jun. 1990, pp. 569-574.

\* cited by examiner

METHOD AND APPARATUS FOR STRUCTURAL DELAY PLASTICITY IN SPIKING NEURAL NETWORKS

BACKGROUND

1. Field

Certain aspects of the present disclosure generally relate to neural system engineering and, more particularly, to a method and apparatus for adaptive structural delay plasticity in spiking neural networks.

2. Background

Neurons of a neural network may receive potential inputs from one or more other neurons in the network. The relative importance of inputs may be learned so that only some potential inputs may become active synapses. However, as the number of potential inputs (neurons) in a circuit or network increases, the processing and memory access requirements may increase significantly. For example, if there are M neurons each with $N \leq M$ possible inputs, there may be at least $M \times N$ potential synapses. Moreover, if connections (synapses) have variable time delays (due to varying connection distance), the number of potential inputs per neuron may be multiplied by a number of possible different time delays (e.g., from 0 to T at time resolution dt yielding R=T/dt possibilities for a total of $M \times N \times R$ potential synapses for the network). It should be noted that a synapse delay might range from 0 to 25 ms or even higher. Since neuron spike timing precision of a millisecond or far less (e.g., 0.1 or 1 microsecond) may be required, this may increase already significant processing (time) and memory requirements dramatically (e.g., by 250 or 25,000 times, respectively). Therefore, a computational solution of reduced complexity for machine learning is desired.

Biological neural networks may solve this problem with structural plasticity (dendritic or axon growth or retraction, spine or bouton turnover, or spine motility). However, methods to solve this problem in neural system engineering are still unknown.

SUMMARY

Certain aspects of the present disclosure provide a method. The method generally includes adapting a delay of a synapse connection between a pre-synaptic neuron circuit and a post-synaptic neuron circuit of a neural network, wherein the adaptation is based on a time between a first spike of the post-synaptic neuron circuit and a second spike of the pre-synaptic neuron circuit.

Certain aspects of the present disclosure provide an apparatus for neural temporal coding. The apparatus generally includes a first circuit configured to adapt a delay of a synapse connection between a pre-synaptic neuron circuit and a post-synaptic neuron circuit of a neural network, wherein the adaptation is based on a time between a first spike of the post-synaptic neuron circuit and a second spike of the pre-synaptic neuron circuit.

Certain aspects of the present disclosure provide an apparatus for neural temporal coding. The apparatus generally includes means for adapting a delay of a synapse connection between a pre-synaptic neuron circuit and a post-synaptic neuron circuit of a neural network, wherein the adaptation is based on a time between a first spike of the post-synaptic neuron circuit and a second spike of the pre-synaptic neuron circuit.

Certain aspects of the present disclosure provide a computer program product. The computer program product generally includes a computer-readable medium comprising code for adapting a delay of a synapse connection between a pre-synaptic neuron circuit and a post-synaptic neuron circuit of a neural network, wherein the adaptation is based on a time between a first spike of the post-synaptic neuron circuit and a second spike of the pre-synaptic neuron circuit.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
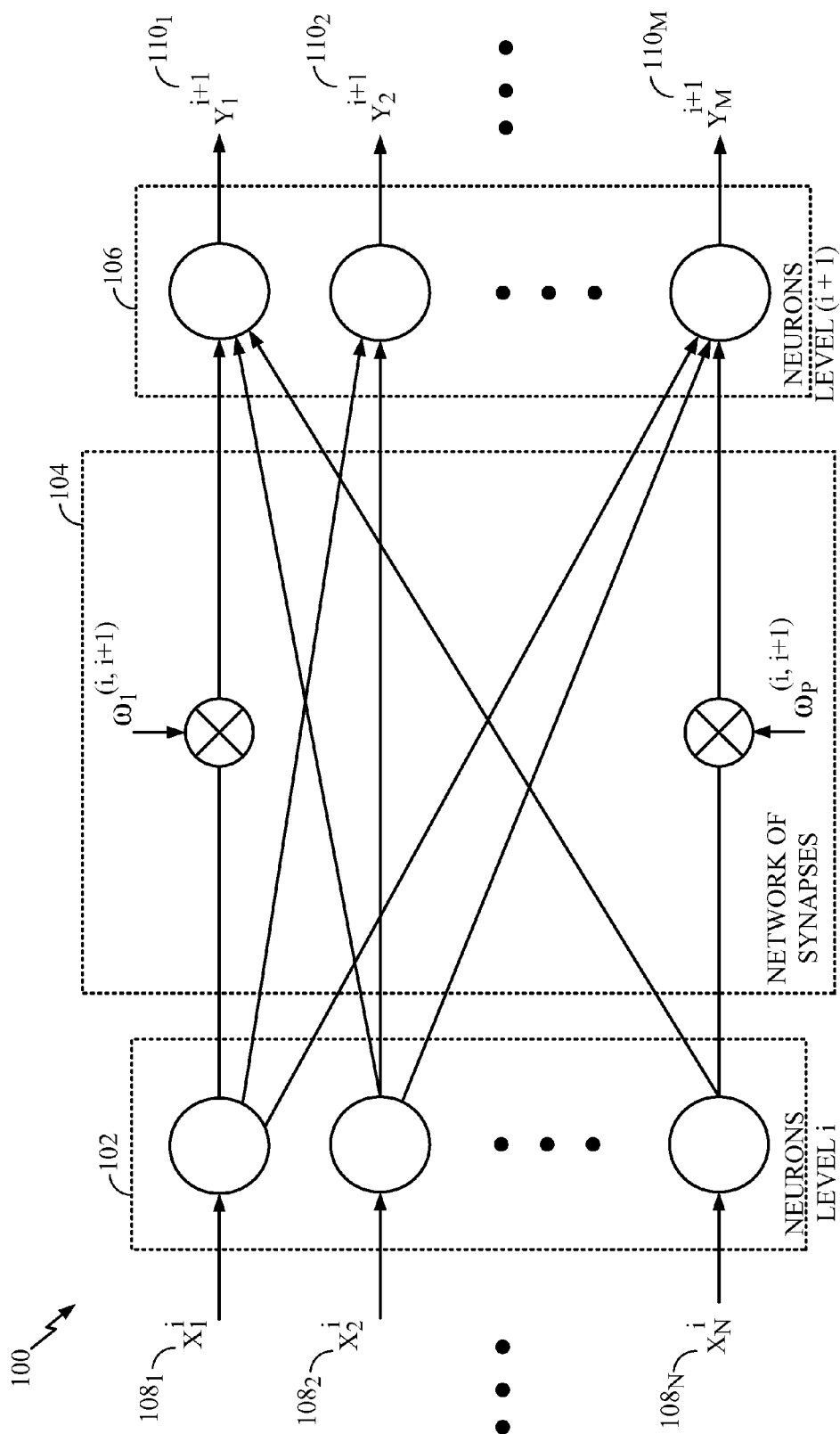
FIG. 1 illustrates an example neural network in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Further, each of the synapses 104 may be associated with a delay, i.e., a time for which an output spike of a neuron of level i reaches a soma of neuron of level i+1.

A neuron in the level 106 may generate output spikes 110 based on a corresponding combined input signal originating from one or more neurons of the level 102. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit or a neural processor. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Certain aspects of the present disclosure support a method of learning (adapting) synaptic delays. Adaptation of synaptic delays may be accompanied by adaptation of synaptic weights (strength or importance). The latter is often referred to as synaptic plasticity. The former can be thought of as structural plasticity in the sense that a spine "moves" to a location with a different delay. More biologically consistently, this can be thought of as a spine retracts and another grows in a new location (but connecting to the axon of the same input neuron) which incurs a different delay. With the proposed method of structural delay plasticity, the necessity of modeling multiple synapses with different delays can be avoided. In this case, far fewer potential synapses may need to be modeled for learning. While this might at first seem simple, the method of adapting delay can be critical when operating a system with learning dynamic neurons or with recurrent or lateral connections. This may be because adjustments to input delay can alter the post-synaptic neuron's firing and thus spike-timing dependent plasticity and other neurons in the network. The present disclosure proposes a method of adapting synapse delays in a manner that is stable and allows a wide-range of delay sampling to develop.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and input may change), and variations thereupon (e.g., delay may change, but no change in weight or input). The advantage of this is that processing can be subdivided. For example, non-plastic synapses may not require plasticity functions to be executed (or waiting for such to complete). Similarly, delay and weight plasticity may be subdivided into operations that may operate in together or separately, in sequence or in parallel. Different types of synapses may have different lookup tables or formulae/parameters for each of the different plasticity types that apply. Thus, the methods would access the relevant tables for the synapse's type.

It can be also valuable to point out further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds. For example, a synapse delay may change only when a weight change occurs or if weights reach zero but not if they are maxed out. However, it can be advantageous to have independent functions so that these processes can be parallelized reducing the number and overlap of memory accesses.

Delay Resolution

Execution of neural network models, whether in software or hardware, may generally proceed in units of time steps such as 1 ms. However, it may be desirable to adjust synapse delays with higher resolution that is actually used. To do so, a delay may need to be stored in a memory with greater resolution than execution requires or resolves. However, structural delay plasticity may make fine adjustments to the stored high-resolution delay that may accumulate to the point of making a difference at the actual execution resolution. This may avoid the problem of having to quantize a spike-timing dependent structural delay plasticity curve, in terms of the difference change in delay, much like incremental changes to weights can be made based on spike-timing dependent plasticity (STDP).

Moreover, higher resolution delay may be achieved in a statistical manner by adding a small random component to the high-resolution delay values (such as a hash of neuron number and a function of time step) before quantizing the delay to the resolvable execution time step.

Merge and Split of Synapses

According to certain aspects of the present disclosure, it may be useful to implement one or more merge-related functions. A merge may occur when two synapses which connect the same pre-synaptic neuron to the same post-synaptic neuron have same (or very similar) delays. At this point, one may merge the two synapses into one by adding their weights (assuming linear integration) and the other synapse may be reused. In this case, a method of avoiding having the second synapse re-develop the same delay may be favorable. Alternatively, merge protection may be implemented to prevent synapses from developing the same delay. Below, methods of merge and merge protection will be explained, and both may be utilized.

Merged synapses may be combined by adding the weights of the merging synapses and setting one of the synapses to that weight. This may be done if the weight does not exceed the maximum. Then, the other(s) may have their weights set to zero (or to a re-initialization value). Generally, the delay may be also changed, if it is desirable to pick out another delay sample of the input. Alternatively, the synapse may be reassigned to another input, wherein another delay sample may be desirable from the same input. In this case, the delay may be set to a minimum value, a random value less than the previous delay. To understand why this may be required, it should be noted that the structural delay plasticity may tend to drive delays up if the synaptic strength is growing. Thus, if there is another valid delay sampling time longer than the current delay, then the existing synapse may propagate in that direction merely due to the plasticity. However, if there is a valid delay sampling time shorter than the current delay, then the only way to reach this point may be to start at a point lower (of less delay). If there are multiple such points, randomization may be beneficial. If merged synapses are instead allowed to exist, then two merged synapses might be allowed to split in the future.

Instead of combining merged synapses, multiple synapses may be maintained. Then, these synapses may be allowed to be split. If an increase in delay would drive both synapses to have larger delay, the increase to only one of the synapses (the one with the largest delay if there is a difference already) may be applied instead. Furthermore, the opposite may be performed for decreases. The delay may be decreased only of the synapse with the shortest delay. This may allow splitting of synapses and multiple-delay sampling of the same input.

In one aspect of the present disclosure, merge protection may also be used. In this case, combining of synapses may be prevented. If two synapses would end up having the same (or close) delay, the delay adjustment may be prevented. This may be used in conjunction with conditional delay adjustment described above. In other words, delay adjustments may be restricted to a subset of synapses for the input on the condition that they are close in time.

It should be noted that merge controls discussed above may place additional processing requirements on hardware or software. However, the requirements may vary depending on the method used. By allowing multiple synapses to exist but by placing constraints on their adjustment, additional required processing may be limited.

Regarding reuse of synapses, a method of sequentially trying out different synapses at different delays may be used. However, sequentially trying out different synapses at different delays may be problematic. Although it may reduce memory requirements compared to multiple synapses per neuron, processing time may still be dramatically high (even higher than with multiple synapses) not only because of the sequence of attempts but also due to an indirect reason. Namely, trying synaptic plasticity for synapses at different (not adapted) delays (i.e., sequentially) may limit the convergence of synaptic plasticity so the synaptic weight may be unstable or take even longer to converge.

Delay Assignment

In one aspect of the present disclosure, a synaptic delay may be assigned directly based on an observed delay. In this case, the synaptic delay may be changed by a pre-post time difference.

However, the concept of delay assignment has certain complications. If, for example, depolarization-to-spike time is non-zero, then neuron spike time may be continuously postponed. Depolarization time may be variable depending in input timing and magnitude. Further, altering neuron firing time may alter inhibition (lateral) time and affect other neurons. The concept of delay assignment may also have limitations due to delay range (and actual output time).

Structural Delay Plasticity

With spike timing dependent plasticity, learning (adaptation) effects typically occur based on the timing relation between pre-synaptic (neuron's input) and post-synaptic events (neuron's output) (spikes). With spike timing dependent plasticity, weights may be adjusted as a function of this time difference. Certain aspects of the present disclosure support examining structural delay plasticity in similar framework.

Causal Considerations

Figure 2:
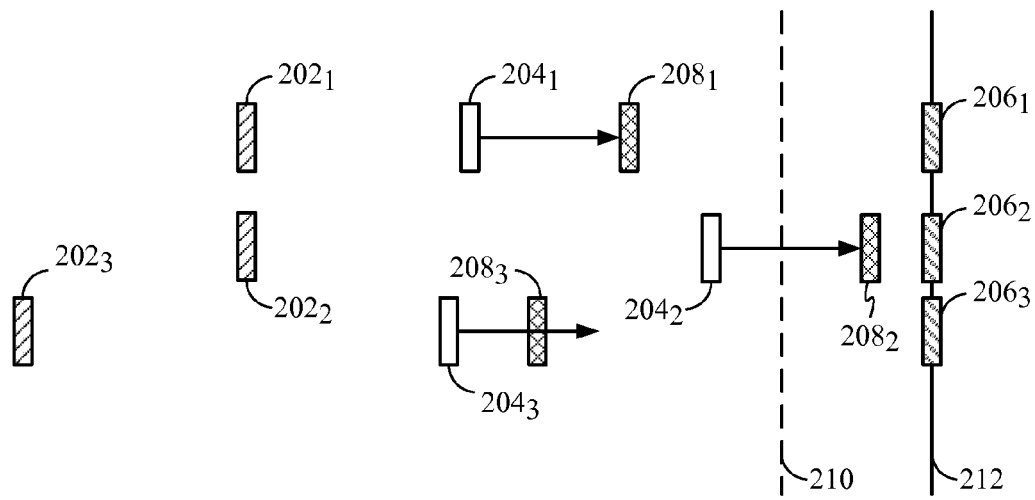
FIG. 2 illustrates an example of pre-synaptic and post-synaptic spiking in accordance with certain aspects of the present disclosure.

First, the case can be considered where a post-synaptic spike occurs after a pre-synaptic spike. In the case of standard spike timing dependent plasticity, the synapse strength (weight) would be driven upward. FIG. 2 illustrates examples of pre-synaptic and post-synaptic spiking in accordance with certain aspects of the present disclosure, where time is represented on the x-axis (horizontally). The actual firing time of a pre-synaptic spike (i.e., a spike $202_1$, $202_2$, or $202_3$ in FIG. 2) may be delayed (e.g., by a dendritic delay) to arrive at a soma of post-synaptic neuron some time later (i.e., at a time instant of a spike $204_1$, $204_2$, or $204_3$, respectively). As a result, a post-synaptic spike (i.e., a spike $206_1$, $206_2$, or $206_3$, respectively) may occur later.

According to certain aspects of the present disclosure, the delay may be increased because of the post-pre time difference being positive. Three time sequence cases are illustrated in FIG. 2, wherein all three cases have been aligned to the post-synaptic spike for clarity. In the first case, an increase would delay the arrival of the input at the soma (i.e., the spike $204_1$) to a time indicated by a spike $208_1$ before a sufficient depolarization time (e.g., a time 210 in FIG. 2). In the second case, the change would delay the arrival of spike $204_2$ to a time indicated by a spike $208_2$ between sufficient depolarization 210 and a peak voltage point 212. In the third case, the change of the arrival of spike $204_3$ would be limited due to a maximum delay constraint (i.e., delayed to a time indicated by a spike $208_3$).

In the present disclosure, it is examined in greater detail why there is a delay from the time when sufficient input is established (i.e., the time 210) until the time when the post-synaptic neuron actually fires (i.e., to the time 212). In a dynamic spiking neuron model, such as Izhikevich's simple model, a time delay may be incurred if there is a difference between a depolarization threshold $v_1$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + i)/C, \quad (1)$$

$$\frac{du}{dt} = a(b(v - v_r) - u). \quad (2)$$

Moreover, the neuron may spike when $v > v_{peak}$. If $v \gg v_r$, given $b < 0$, du/dt may drive u negative, accelerating the increase in v over a threshold. However, when $a \ll 1$, the change may be relatively small and may motivate ignoring u for this part. In addition, if there is no further input, then the following may hold:

$$t \cong \int_{v_s}^{v_p} \frac{C}{k} \Big/ (v - v_t)(v - v_r), \quad (3)$$

$$t \cong \frac{C}{qk} \ln \left| \frac{2v - (v_t + v_r) - q}{2v - (v_t + v_r) + q} \right|_{v_s}^{v_p}, \quad (4)$$

where $q = \sqrt{(v_t + v_r)^2 - 4v_t v_r}$. If $v_s = v_t$, $t \to \infty$, but if a suprathreshold is at least 10 mV (40 mV), t defined by equations (3)-(4) may be up to 6 ms (1.2 ms).

There are several critical points regarding this aspect. First, the delay between sufficient input to depolarize over the threshold and the post-synaptic spike time may vary depending on the amount of input and the relative timings between those inputs. Thus, it may be preferable to adjust delay slowly so that the post-synaptic spike is not moved or learning is not destabilized. Second, any input between the sufficient depolarization and spike may be superfluous in the sense of whether a spike will occur or not, but may still decrease the time to spike. While these first and second points may not occur with other neuron models, there may be a third point: any leaky integrate and fire neuron model may have sensitivity to the relative timing of inputs because those inputs leak (decay). Thus, moving inputs around in time may destabilize the post-synaptic firing time. As a result, it may be desirable to make relatively small or slow adjustments to delay.

Because of the above, if the delay of a synapse exhibiting positive post-pre relation increases by an amount that would bring the new arrival time into the depolarization-to-spike window, then the post-synaptic spike may be merely delayed. Repeating this would push the post-synaptic spike later and later in time. Thus, simply increasing the delay by the post-pre time difference or even any large amount may incur this risk. This can be expressed as a probability that a delay increase for synapse s will have an undesired effect based on a function of the current delay $C_t^d(s)$, the delay bounds $[T_{min}, T_{max}]$, the post-pre time difference $\Delta t_t^n(s)$ and all other input statistics for the post-synaptic neuron $X_t(n)$, i.e.:

$$p_u^+(s) = f(C_t^d(s), [T_{min}, T_{max}], \Delta t_t^n(s), X_t(n)). \quad (5)$$

For simplifying equation (5), it may be preferable to ignore one or more complications that would result into computationally burdensome calculation. For example, it can be observed that the risk may generally increase in moving closer to the post-synaptic spike time. Hence, equation (5) may be simplified to:

$$p_u^+(s) \sim 1/\Delta t_t^n(s) \text{ or } p_u^+(s) \sim 1 - \Delta t_t^n(s)/T, \quad (6)$$

where T is a normalizing time factor.

Next, it can be considered what may happen if the delay is constrained to an upper bound. It can be similarly observed that the probability of hitting the bound may increase as the amount of post-pre delay increases (in contrast to the above). Again, this probability may actually depend on all the same parameters, but again it can be simplified to:

$$p_l^+(s) \sim \Delta t_t^n(s). \quad (7)$$

In other words, it may not be preferable attempting to aggressively increase delay incrementally, if it is known in advance that it is unlikely to reach the required delay amount.

According to certain aspects of the present disclosure, two probabilities defined by equations (6)-(7) may present a balancing situation. If the post-pre delay is large, then it may be less desirable to increase the delay. Also, if the post-pre delay is small, it may be less desirable to increase the delay. If the post-pre delay is somewhere between, then it may be preferable to significantly increase the delay. Essentially, the amount to increase the delay by may be related to the inverse of the probability of risk, i.e.:

$$\Delta C_t^d(s) \sim (1 - p_u^+(s)) \cdot (1 - p_l^+(s)). \quad (8)$$

One example of computation motivated according to the above reasoning can be to increase (adapt) the delay by an amount, $$\Delta C_t^d(s) = \alpha^+(\Delta t_t^n(s)) \cdot (1 - \Delta t_t^n(s)/T), \quad (9)$$

where $\alpha^+$ may be used for gain (adaptation rate) control or normalization.

Non-Causal Considerations

Figure 3:
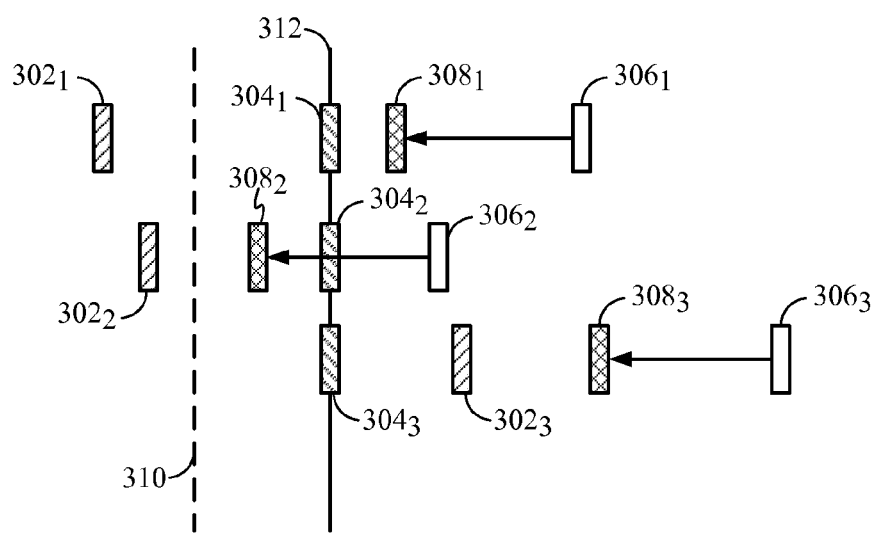
FIG. 3 illustrates another example of pre-synaptic and post-synaptic spiking in accordance with certain aspects of the present disclosure.

Next, it can be considered a situation where a post-synaptic spike occurs before a pre-synaptic spike. Three exemplary time sequence cases are illustrated in FIG. 3. Again, all three cases have been aligned to the post-synaptic spike for clarity. The actual firing time of a pre-synaptic spike (spike $302_1$, or spike $302_2$) may occur before a post-synaptic spike (spike $304_1$, or spike $304_2$), or it may occur after a post-synaptic spike (a spike $302_3$ versus a spike $304_3$ in FIG. 3). However, for spike-timing plasticity, it should be considered a time of arrival (i.e., a time of spike $306_1$, $306_2$, or $306_3$ in FIG. 3) at the soma of the post-synaptic neuron, which may spike before that time (i.e., a time of spike $304_1$, $304_2$, or $304_3$). In this case, standard spike timing dependent plasticity may drive the weight (strength) of this synapse downward. However, if the actual pre-synaptic spike is before the post-synaptic spike, it may be possible to bring this causal relation into the realm of learning possibilities for this post-synaptic neuron.

Three demonstrative possibilities can be considered, as illustrated in FIG. 3. In the first case, if a pre-synaptic spike (i.e., the spike $302_1$) actually occurred earlier than a post-synaptic spike (i.e., the spike $304_1$), it may be preferable to decrease a delay of spike $306_1$ toward the causal relation (e.g., a delay of spike $308_1$ illustrated in FIG. 3 is not sufficiently decreased). In the second case, if the delay can be decreased sufficiently (e.g., a spike $308_2$ with decreased delay), it may be still preferable to avoid bringing the delayed post-synaptic spike (at the soma) into the depolarization-to-spike time window (e.g., into a time period between instants 310 and 312 in FIG. 3). In the third case, if the post-pre relation is positive, it may not be desirable to decrease delay, e.g., to a spike $308_3$.

The situation can be similar to the aforementioned causal case with some exceptions. Namely, the motivation can be to consider the probability (or risk) of bringing the delayed pre-synaptic spike input time into the depolarization-to-spike zone and the probability of not being able to reach the causal side (either because of a minimum delay bound or because the relation to the actual time is not causal).

For computational purposes, the motivation is to simplify the consideration of these probabilities based on all the factors (as discussed above for the causal case). By similar reasoning to the causal case, the following may hold:

$$\Delta C_t^d(s) = -\alpha^-(\Delta t_t^n(s)) \cdot (1 - \Delta t_t^n(s)/T), \quad (10)$$

except that this may hold for the case when $\Delta t_t^n(s)$ is negative, and where $\alpha^-$ may be used for gain (adaptation rate) control or normalization. In one aspect of the present disclosure, the causal and non-causal equations (9) and (10) may be combined into a common expression. In another aspect, the causal and non-causal cases may be computed (or applied) separately. Further, the delay adjustments may be quantized.

Causal and Non-Causal Considerations

In the process of learning, pre-synaptic spikes may occur both before and after post-synaptic spikes. This brings up issues of balancing delay adaptation effects from a statistical point of view. For example, it can be considered that it may be less likely to bring a late non-causal input back into the useful causal region because it may be desired to avoid the depolarization-to-spike window. However, perhaps counter-intuitively, it may be preferable to be more aggressive with delay decrease than increase. The reason for this and further considerations may become evident when considering delay adaptation in the context of simultaneous or parallel spike timing dependent plasticity.

Figure 4:
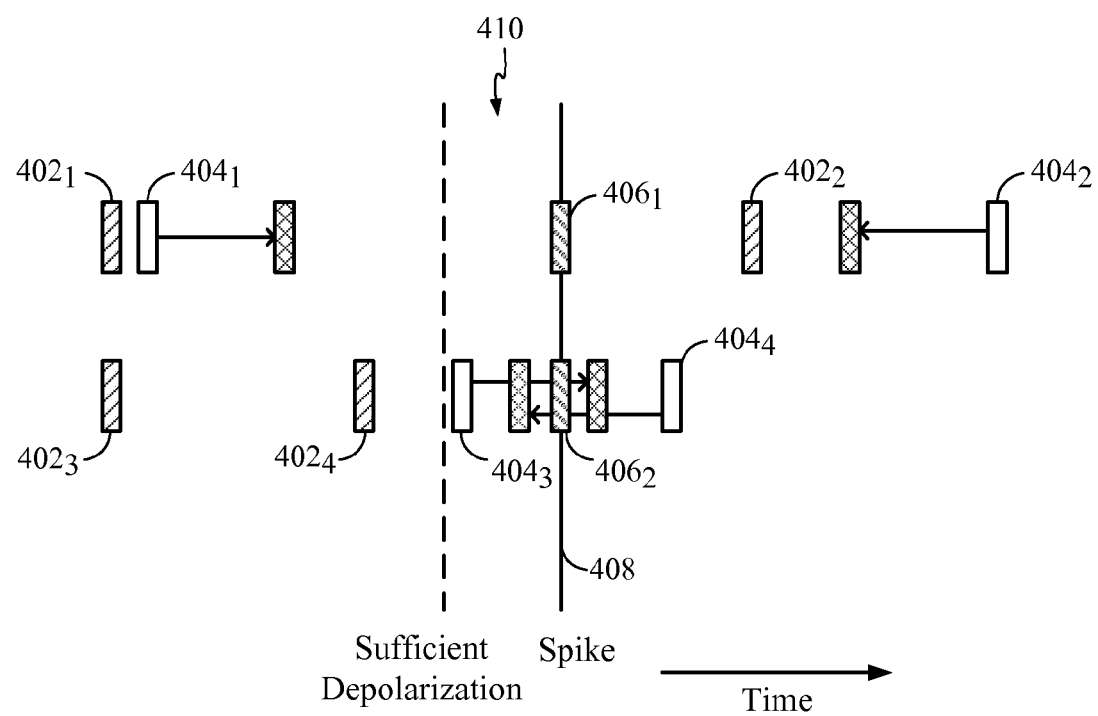
FIG. 4 illustrates another example of pre-synaptic and post-synaptic spiking in accordance with certain aspects of the present disclosure.

Two example cases are illustrated in FIG. 4. In the first case, actual and delayed pre-synaptic spikes (spikes $402_1$ and $404_1$, respectively) may be causal, and non-causal (spikes $402_2$ and $404_2$, respectively), and may be far from a post-synaptic spike time (i.e., a spiking time 408 of a spike $406_1$). In the second case, actual pre-synaptic spikes (i.e., spikes $402_3$, $402_4$) may be causal, but delayed spikes (i.e., spikes $404_3$, $404_4$) may be causal and non-causal, respectively, and may be close to the post-synaptic spike time 408 of a spike $406_2$.

If an input occurs both before and after post-synaptic spike, but quite far in time, the question is which one is preferable: to move the late input earlier or to move the early input later. In an aspect, it can be considered only one synapse for this connection (input and output neuron pair). Despite a depolarization-to-spike zone 410, it may be preferable to decrease delay to (a) minimize the processing delay for the post-synaptic neuron, and (b) maximize the chance that the post-synaptic neuron can learn a close causal relation or a firing rate relation. However, it may be also reasonable to increase the delay in this case, if it is desirable that unanticipated or new inputs have minimal impact on post-synaptic firing time to begin with (by having large delay, they may thus be likely non-causal before adaptation). In the following discussion, the former will be used in examples.

Figure 5:
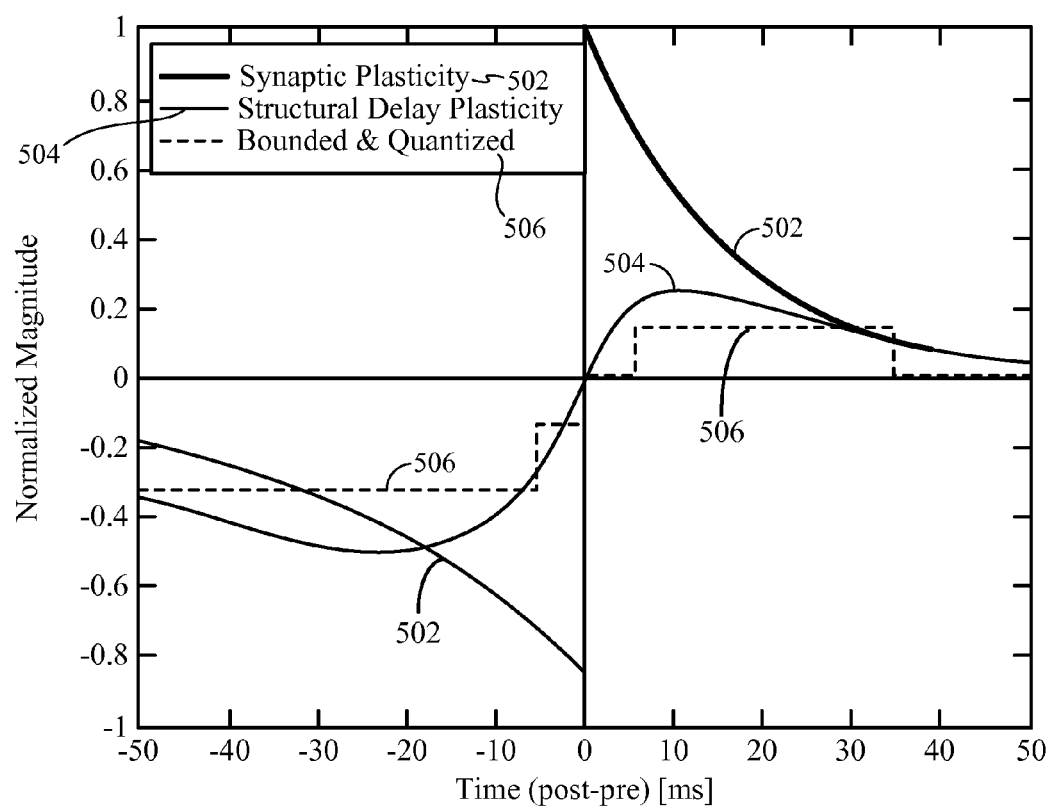
FIG. 5 illustrates an example graph of adaptive structural delay plasticity in accordance with certain aspects of the present disclosure.

A typical spike-timing dependent plasticity curve 502 is illustrated in FIG. 5. It can be noticed that positive increases in weight at large positive post-pre delay may be smaller than negative increases in weight at large negative post-pre delay. In other words, if the above situation occurred, accumulated weight change might be negative (ignoring changing delay). This situation would reverse for small positive versus small negative post-pre delay. Thus, it may be preferable to do the opposite in small delay situations. However, this may be outweighed by risks associated with moving the pre-synaptic spike time into the depolarization-to-spike zone.

Along with the spike timing dependent synaptic plasticity curve 502, a combined spike-timing dependent structural delay plasticity curve 504 is illustrated in FIG. 5. It can be noticed that the decrease of delay adaptation may be generally larger than the increase of delay adaptation, and that the increase may decay to zero faster than the decrease. The exact shape of the spike-timing dependent structural delay plasticity curve may however vary.

In case of real-valued delay resolution, a synapse delay may be adjusted by any fractional amount. However, typically, a delay may have limited resolution in a model, such as a 1 ms time step. In this case, it may not be possible to increase delay by less than this amount because it will effectively be equivalent to zero adjustment. Instead, the adjustment may need to be at least one time unit in order to have any effect. Further, if it is preferable to bias toward a decrease, then the option may be to decrease delay by even more than 1 ms on the non-causal side. An example of quantization is illustrated in FIG. 5 with a curve 506. The curves 504 and 506 have been normalized differently from the curve 502, and they represent different terms from the curve 502. The y-axis of curve 502 represents a weight change (with +1 and −1 being weight change bounds). The curves 504 and 506 illustrate delay changes (with the maximum delay change being arbitrarily set near the half way point for clarity of the graph only). The actual delay change bounds may be, for example, +1 ms and −2 ms.

In terms of an algorithmic implementation, a delay may be adjusted based on nominal adjustment to weight (structural delay plasticity being a function of synaptic plasticity). This might be considered before applying bounds to the synaptic plasticity (weight max or min). Therefore, $\Delta C_t^w(s)$ being the synaptic weight adjustment before bounding, the following may hold:

$$\Delta C_t^d(s) = \alpha^+(\Delta C_t^w(s) > 0)\left(1 - \frac{\Delta C_t^w(s)}{\beta^+}\right)\left(\frac{\Delta C_t^w(s)}{\beta^+}\right) - - \quad (11)$$
$$\alpha^-(\Delta C_t^w(s) < 0)\left(1 - \frac{\Delta C_t^w(s)}{\beta^-}\right)\left(\frac{\Delta C_t^w(s)}{\beta^-}\right),$$

where $\beta^+$ and $\beta^-$ are weight learning rate normalization factors. Then, rounding may be applied to the adjustment in order to obtain whole number adjustments to delay step and also bound, or these may be applied after the adjustment as so, $$C_t^d(s) = \max(T_{min}, \min(T_{max}, \text{round}(C_t^d(s) + \Delta C_t^d(s)))). \quad (12)$$

According to certain aspects of the present disclosure, it may be required to have delay adaptation as a function of weight adaptation. Any shape of the curve 504 from FIG. 5 can be achieved by direct relation rather than expressing that curve as a function of the synaptic plasticity curve. A simple but similar expression as the equation (11) would be, $$\Delta C_t^d(s) = \alpha^+ (\Delta t_t^n(s) > 0) \left(1 - \frac{\Delta t_t^n(s)}{T^+}\right)\left(\frac{\Delta t_t^n(s)}{T^+}\right) -- \qquad (13)$$
$$\alpha^- (\Delta t_t^n(s) < 0)\left(1 - \frac{\Delta t_t^n(s)}{T^-}\right)\left(\frac{\Delta t_t^n(s)}{T^-}\right).$$

With multiple synapses per pre-synaptic neuron and post-synaptic neuron pair, it may be preferable to allow the multiple synapses to converge to different delays. This may occur merely because of prior conditions (e.g., random initial delays) or because of different delay bounds. However, it may be also preferable to apply merge and anti-merge conditions.

Figure 6:
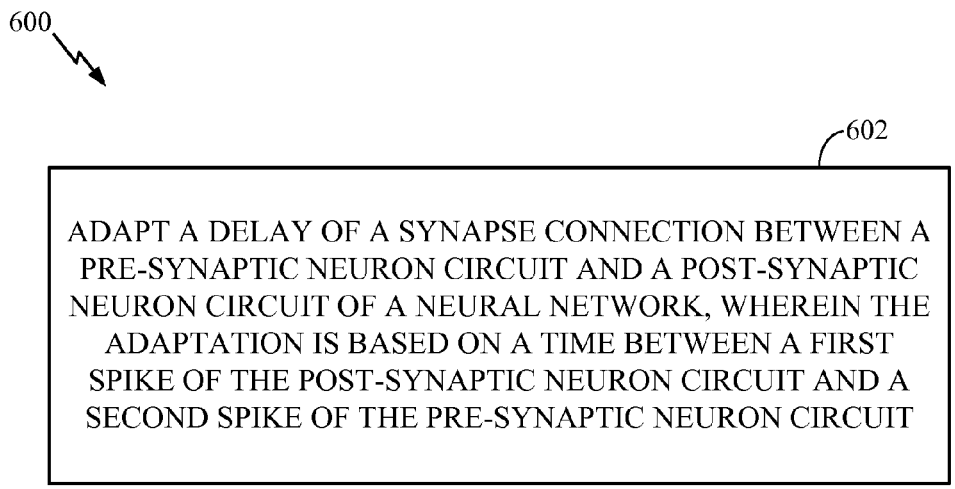
FIG. 6 illustrates operations of adaptive structural delay plasticity in accordance with certain aspects of the present disclosure.

FIG. 6 illustrates operations 600 of adaptive structural delay plasticity in accordance with certain aspects of the present disclosure. At 602, a delay of a synapse connection between a pre-synaptic neuron circuit and a post-synaptic neuron circuit of a neural network may be adapted, wherein the adaptation may be based on a time between a first spike of the post-synaptic neuron circuit and a second spike of the pre-synaptic neuron circuit.

In an aspect, adapting the delay may comprise increasing the delay by a first amount, if the first spike occurs after the second spike. In another aspect, adapting the delay may comprise decreasing the delay by a second amount, if the first spike occurs before the second spike. The second amount may be larger than the first amount, if a time period between the first spike occurring after the second spike is same as another time period between the second spike occurring after the first spike.

In an aspect, adapting the delay may comprise increasing the delay by a largest possible amount, if the time between the first and second spikes is within a time range, as illustrated by the curve 504 in FIG. 5. Further, the delay may not be changed, if the post-synaptic neuron circuit and the pre-synaptic neuron circuit do not fire. In an aspect, the delay of synapse connection may be bounded and/or quantized following the adaptation.

Figure 7:
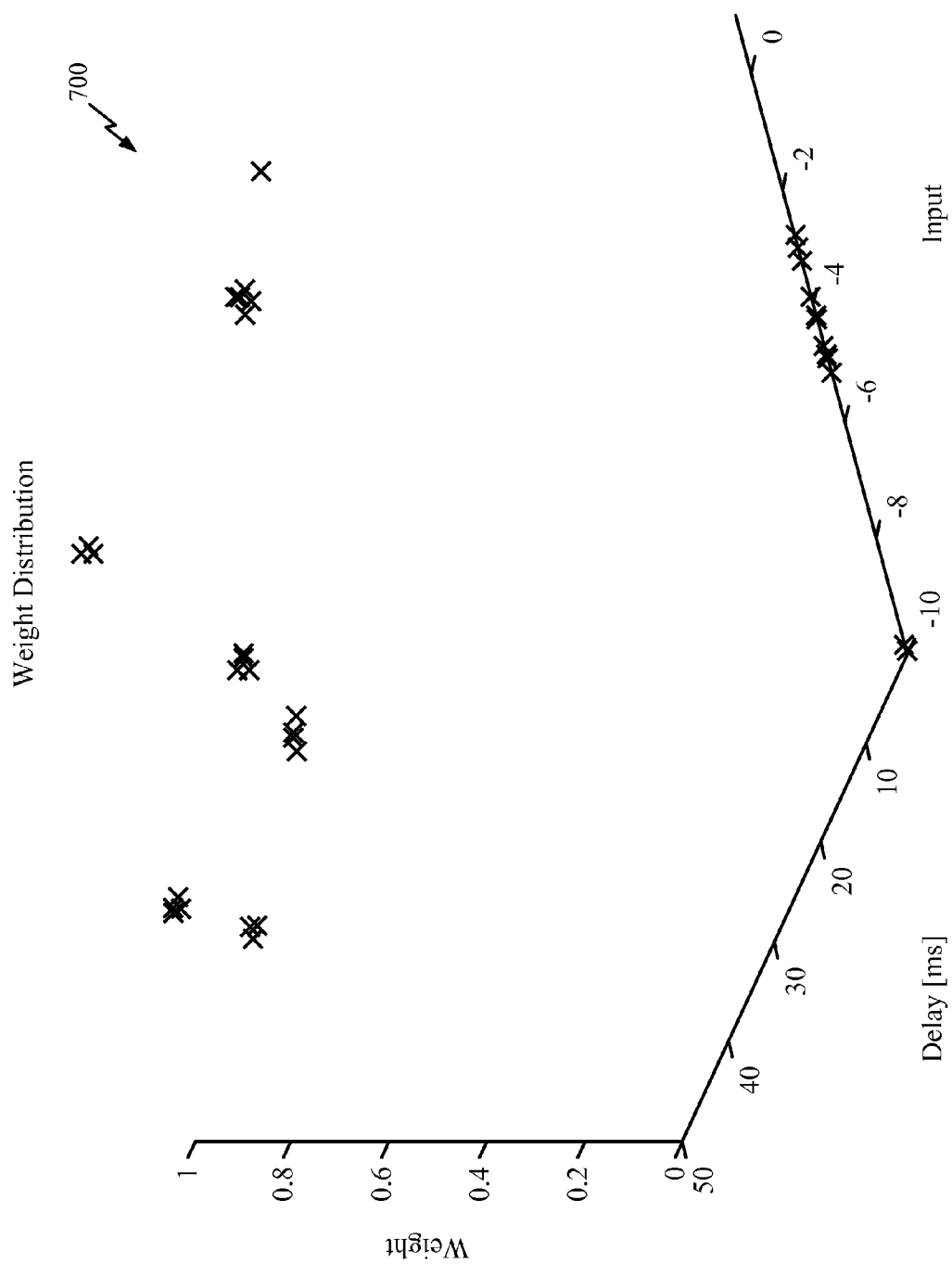
FIG. 7 illustrates an example of synaptic delay diversity in accordance with certain aspects of the present disclosure.

FIG. 7 illustrates an example 700 of synaptic delay diversity in accordance with certain aspects of the present disclosure. In the example 700, weight-delay distribution of synapses having same or different inputs is illustrated, wherein the weights and delays may be obtained based on the aforementioned spike-timing dependent structural delay plasticity concept illustrated in FIG. 5. It should be noted that synapses on the same input may not converge to the same delay. Only if there is no diversity in an input, then all synapses on that input may converge to the same delay, unless a merge-protection is applied. If there is diversity in the input, multiple delays may develop, particularly with population coding. It should be also noted that lateral inhibition may reduce the chance of developing multiple delays of synapses on the same input.

In an aspect of the present disclosure, weight adaptation with structural delay plasticity may result into polarization of weights, i.e., they may converge to either zero or one. In this way, pattern recognition may be more reliable.

Figure 8:
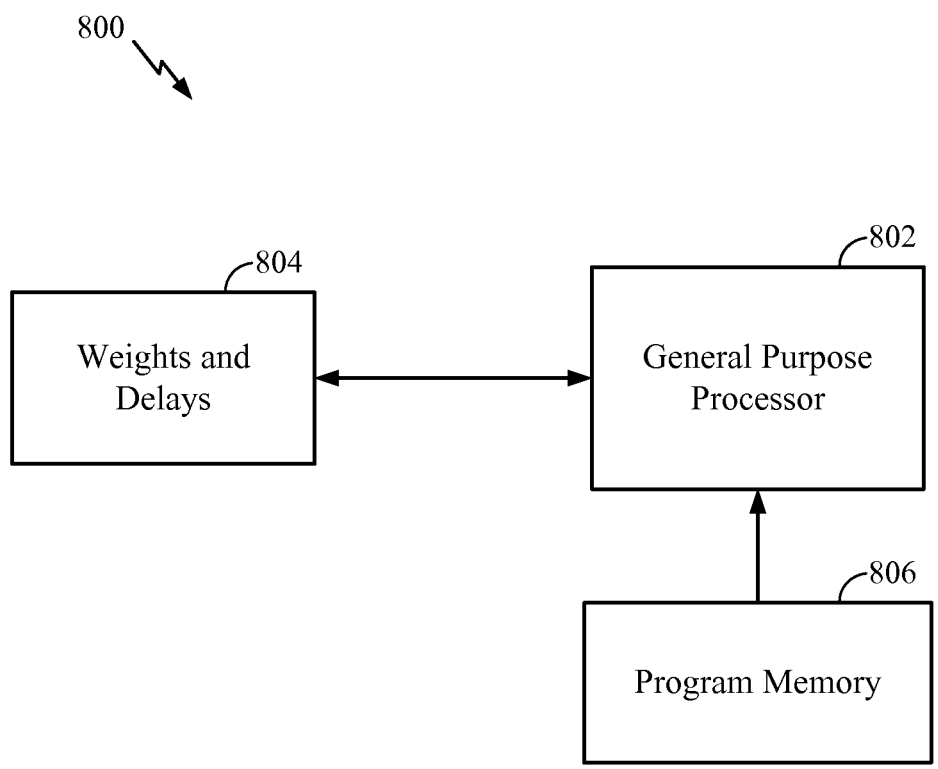
FIG. 8 illustrates an example software implementation of adaptive structural delay plasticity using a general-purpose processor in accordance with certain aspects of the present disclosure.

FIG. 8 illustrates an example software implementation 800 of the adaptive structural delay plasticity using a general-purpose processor 802 in accordance with certain aspects of the present disclosure. Weights and delays associated with connections (synapses) of a computational network (neural network) may be stored in a memory block 804. The instructions related to the adaptive structural delay plasticity being executed at the general-purpose processor 802 may be loaded from a program memory 806. In an aspect of the present disclosure, the instructions loaded into the general-purpose processor 802 may comprise code for adapting a delay of a synapse connection between a pre-synaptic neuron and a post-synaptic neuron of the neural network, wherein the adaptation may be based on a time between a first spike of the post-synaptic neuron and a second spike of the pre-synaptic neuron.

Figure 9:
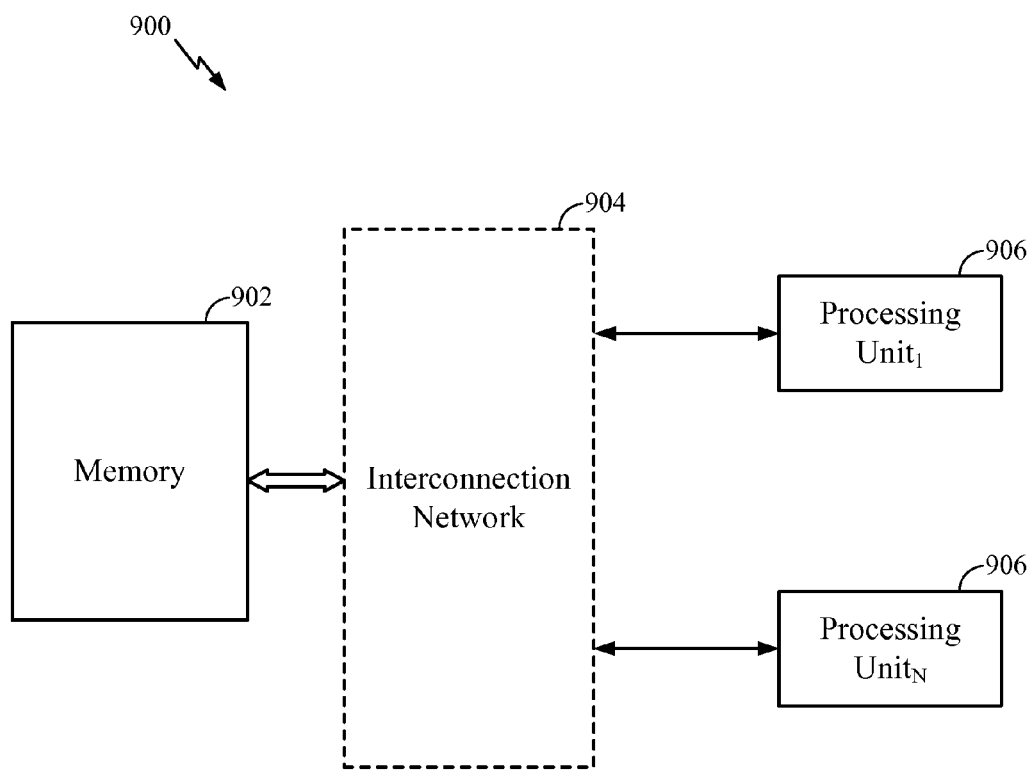
FIG. 9 illustrates an example implementation of adaptive structural delay plasticity where a synapse delay memory is interfaced with individual distributed processing units in accordance with certain aspects of the present disclosure.

FIG. 9 illustrates an example implementation 900 of the adaptive structural delay plasticity where a memory 902 can be interfaced via an interconnection network 904 with individual (distributed) processing units (neural processors) 906 of a computational network (neural network) in accordance with certain aspects of the present disclosure. One or more weights and delays associated with one or more connections (synapses) of the computational network (neural network) may be loaded from the memory 902 via connection(s) of the interconnection network 904 into each processing unit (neural processor) 906. In an aspect of the present disclosure, the processing unit 906 may be configured to adapt a delay of a synapse connection between a pre-synaptic neuron and a post-synaptic neuron of the neural network, wherein the adaptation may be based on a time between a first spike of the post-synaptic neuron and a second spike of the pre-synaptic neuron.

Figure 10:
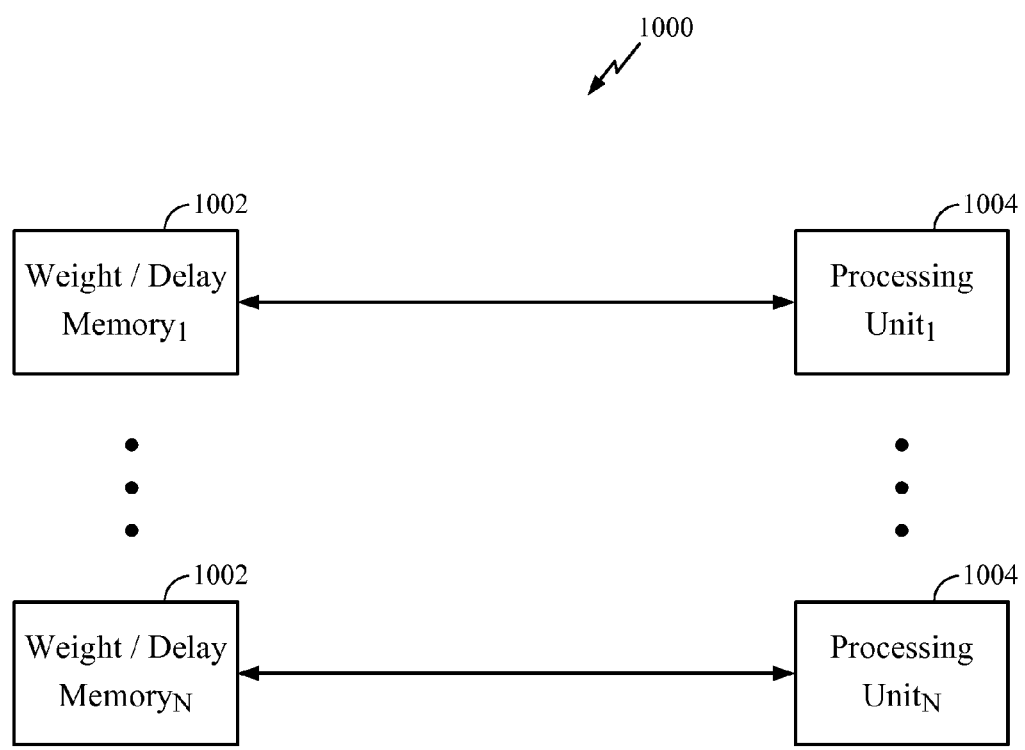
FIG. 10 illustrates an example implementation of adaptive structural delay plasticity based on distributed synapse delay memories and distributed processing units in accordance with certain aspects of the present disclosure.

FIG. 10 illustrates an example implementation 1000 of the adaptive structural delay plasticity based on distributed weight/delay memories 1002 and distributed processing units (neural processors) 1004 in accordance with certain aspects of the present disclosure. As illustrated in FIG. 10, one memory bank 1002 may be directly interfaced with one processing unit 1004 of a computational network (neural network), wherein that memory bank 1002 may store one or more weights and delays of one or more connections (synapses) associated with that processing unit (neural processor) 1004. In an aspect of the present disclosure, the processing unit 1004 may be configured to adapt a delay of a synapse connection between a pre-synaptic neuron and a post-synaptic neuron of the neural network, wherein the adaptation may be based on a time between a first spike of the post-synaptic neuron and a second spike of the pre-synaptic neuron.

There are several main benefits of the presented method of adaptive structural delay plasticity. First, multi-fold reduction in network execution processing may be achieved, along with spike routing and memory accesses (whether software or hardware). Second, multi-fold acceleration in learning rate/time may be obtained. Third, reduction in memory required for describing connectivity may be achieved. Fourth, it may be possible to incorporate/associate more synaptic inputs which can improve pattern matching and other neural network functions. Fifth, online learning may be stabilized, even with lateral inhibition, recurrence, dynamic neuron models, and so on.

Figure 6A:
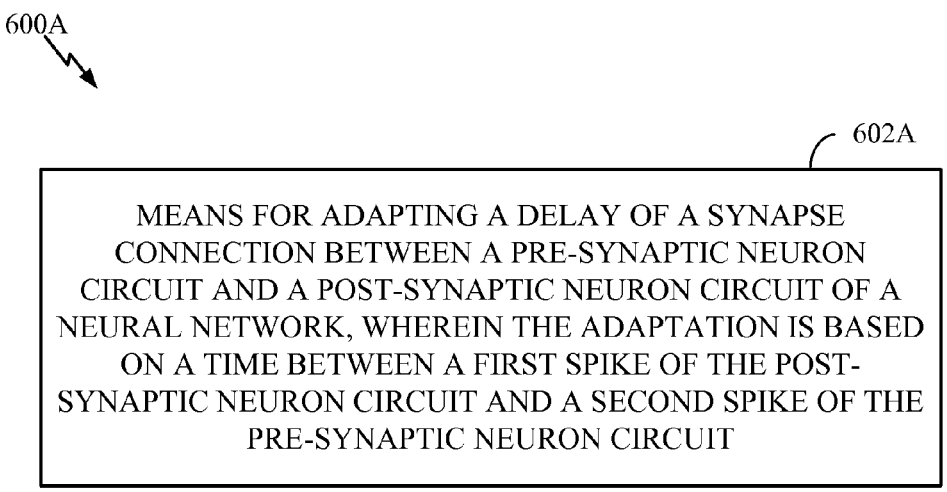
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Bluray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:
1. A method, comprising:
adapting a delay of a synapse connection between a pre-synaptic neuron circuit and a post-synaptic neuron circuit of a neural network, wherein the adaptation is based on a time between a first spike of the post-synaptic neuron circuit and a second spike of the pre-synaptic neuron circuit, wherein adapting the delay comprises increasing the delay by a first amount, if the first spike occurs after the second spike, and decreasing the delay by a second amount, if the first spike occurs before the second spike, and wherein the second amount is larger than the first amount, if a time period between the first spike occurring after the second spike is the same as another time period between the second spike occurring after the first spike.

2. The method of claim 1, wherein adapting the delay comprises:
increasing the delay by a largest possible amount, if the time between the first and second spikes is within a time range.

3. The method of claim 1, wherein the delay is not changed, if the post-synaptic neuron circuit and the pre-synaptic neuron circuit do not fire.

4. The method of claim 1, further comprising:
bounding the delay of synapse connection following the adaptation.

5. The method of claim 1, further comprising:
quantizing the delay of synapse connection following the adaptation.

6. The method of claim 1, wherein adapting the delay further comprises:
adjusting the delay based on a nominal adjustment of a weight associated with the synapse connection.

7. The method of claim 1, further comprising:
assigning, prior to the adaptation, the delay based on an observed delay of the synapse connection.

8. A hardware apparatus, comprising:
a first circuit configured to adapt a delay of a synapse connection between a pre-synaptic neuron circuit and a post-synaptic neuron circuit of a neural network,
wherein the adaptation is based on a time between a first spike of the post-synaptic neuron circuit and a second spike of the pre-synaptic neuron circuit,
wherein the first circuit is also configured to increase the delay by a first amount, if the first spike occurs after the second spike, and decrease the delay by a second amount, if the first spike occurs before the second spike, and wherein the second amount is larger than the first amount, if a time period between the first spike occurring after the second spike is the same as another time period between the second spike occurring after the first spike.

9. The apparatus of claim 8, wherein the first circuit is also configured to:
increase the delay by a largest possible amount, if the time between the first and second spikes is within a time range.

10. The apparatus of claim 8, wherein the delay is not changed, if the post-synaptic neuron circuit and the pre-synaptic neuron circuit do not fire.

11. The apparatus of claim 8, further comprising:
a second circuit configured to bound the delay of synapse connection following the adaptation.

12. The apparatus of claim 8, further comprising:
a second circuit configured to quantize the delay of synapse connection following the adaptation.

13. The apparatus of claim 8, wherein the first circuit is also configured to:
adjust the delay based on a nominal adjustment of a weight associated with the synapse connection.

14. The apparatus of claim 8, further comprising:
a second circuit configured to assign, prior to the adaptation, the delay based on an observed delay of the synapse connection.

15. An apparatus, comprising:
means for adapting a delay of a synapse connection between a pre-synaptic neuron circuit and a post-synaptic neuron circuit of a neural network,
wherein the adaptation is based on a time between a first spike of the post-synaptic neuron circuit and a second spike of the pre-synaptic neuron circuit,
wherein the means for adapting the delay comprises means for increasing the delay by a first amount, if the first spike occurs after the second spike, and means for decreasing the delay by a second amount, if the first spike occurs before the second spike, and wherein the second amount is larger than the first amount, if a time period between the first spike occurring after the second spike is the same as another time period between the second spike occurring after the first spike.

16. The apparatus of claim 15, wherein the means for adapting the delay comprises:
means for increasing the delay by a largest possible amount, if the time between the first and second spikes is within a time range.

17. The apparatus of claim 15, wherein the delay is not changed, if the post-synaptic neuron circuit and the pre-synaptic neuron circuit do not fire.

18. The apparatus of claim 15, further comprising:
means for bounding the delay of synapse connection following the adaptation.

19. The apparatus of claim 15, further comprising:
means for quantizing the delay of synapse connection following the adaptation.

20. The apparatus of claim 15, wherein the means for adapting the delay further comprises:
means for adjusting the delay based on a nominal adjustment of a weight associated with the synapse connection.

21. The apparatus of claim 15 further comprising:
means for assigning, prior to the adaptation, the delay based on an observed delay of the synapse connection.

22. A computer program product, comprising a non-transitory computer-readable medium comprising code for:
adapting a delay of a synapse connection between a pre-synaptic neuron circuit and a post-synaptic neuron circuit of a neural network,
wherein the adaptation is based on a time between a first spike of the post-synaptic neuron circuit and a second spike of the pre-synaptic neuron circuit,
wherein the code for adapting the delay comprises code for increasing the delay by a first amount, if the first spike occurs after the second spike, and code for decreasing the delay by a second amount, if the first spike occurs before the second spike, and wherein the second amount is larger than the first amount, if a time period between the first spike occurring after the second spike is the same as another time period between the second spike occurring after the first spike.

23. The computer program product of claim 22, wherein the computer-readable medium further comprising code for:
increasing the delay by a largest possible amount, if the time between the first and second spikes is within a time range.

24. The computer program product of claim 22, wherein the delay is not changed, if the post-synaptic neuron circuit and the pre-synaptic neuron circuit do not fire.

25. The computer program product of claim 22, wherein the computer-readable medium further comprising code for:
   bounding the delay of synapse connection following the adaptation.

26. The computer program product of claim 22, wherein the computer-readable medium further comprising code for:
   quantizing the delay of synapse connection following the adaptation.

27. The computer program product of claim 22, wherein the computer-readable medium further comprising code for:
   adjusting the delay based on a nominal adjustment of a weight associated with the synapse connection.

28. The computer program product of claim 22, wherein the computer-readable medium further comprising code for:
   assigning, prior to the adaptation, the delay based on an observed delay of the synapse connection.

* * * * *